(12) United States Patent
Cooper

(10) Patent No.: US 7,581,460 B2
(45) Date of Patent: Sep. 1, 2009

(54) DRIVE ASSEMBLY

(75) Inventor: James Nicholas Cooper, Huddersfield (GB)

(73) Assignee: Civic Environmental Systems Limited, Sheffield (GB)

( * ) Notice: Subject to any disclaimer, the term of this patent is extended or adjusted under 35 U.S.C. 154(b) by 852 days.

(21) Appl. No.: 10/999,682

(22) Filed: Nov. 30, 2004

(65) Prior Publication Data

US 2006/0117907 A1    Jun. 8, 2006

(51) Int. Cl.
- *F16H 27/02* (2006.01)
- *F16H 31/00* (2006.01)
- *G05G 1/00* (2006.01)
- *G05G 3/00* (2006.01)
- *E21B 3/02* (2006.01)

(52) U.S. Cl. ............... 74/128; 74/129; 74/575; 175/113

(58) Field of Classification Search ............ 74/128, 74/129, 575, 158; 175/113; 464/165; 81/57.39
See application file for complete search history.

(56) References Cited

U.S. PATENT DOCUMENTS

| | | | |
|---|---|---|---|
| 2,684,597 A * | 7/1954 | Binks .................. | 74/158 |
| 2,870,637 A * | 1/1959 | Johnson et al. ........ | 74/128 |
| 3,186,260 A | 6/1965 | Dugas | |
| 3,515,009 A | 6/1970 | Matusch et al. | |
| 3,791,229 A * | 2/1974 | Liedtke ................. | 74/128 |
| 3,874,196 A * | 4/1975 | Hisey et al. ........... | 464/165 |
| 4,086,830 A * | 5/1978 | Latham ................. | 81/57.39 |
| 4,719,978 A * | 1/1988 | Klemm ................. | 175/113 |
| 5,953,958 A * | 9/1999 | Young .................. | 74/129 |

FOREIGN PATENT DOCUMENTS

| | | |
|---|---|---|
| EP | 0 256 628 A | 2/1988 |
| FR | 943069 A | 2/1949 |
| FR | 1324998 A | 4/1963 |
| GB | 985072 A | 3/1965 |
| GB | 2344584 | 6/2000 |
| WO | WO 99/16730 A | 4/1999 |

* cited by examiner

*Primary Examiner*—Vinh T Luong
(74) *Attorney, Agent, or Firm*—Milbank, Tweed, Hadley & McCloy LLP

(57) ABSTRACT

A drive assembly, particularly for driving arms around a compartment in a waste material digester, comprises a rotatable hub having an inner drive plate and a ratchet plate secured thereto for rotation therewith. Positionally opposed, parallel piston and cylinder drive reciprocatably drive an outer drive plate, drive arms pivotally carried on the outer drive plate engaging with drive pins on the inner drive plate to drive the hub in one direction. Movement of the hub in the opposite direction is prevented by latches engaging with respective shoulders of the ratchet plate when the outer drive plate moves in said opposite direction.

7 Claims, 5 Drawing Sheets

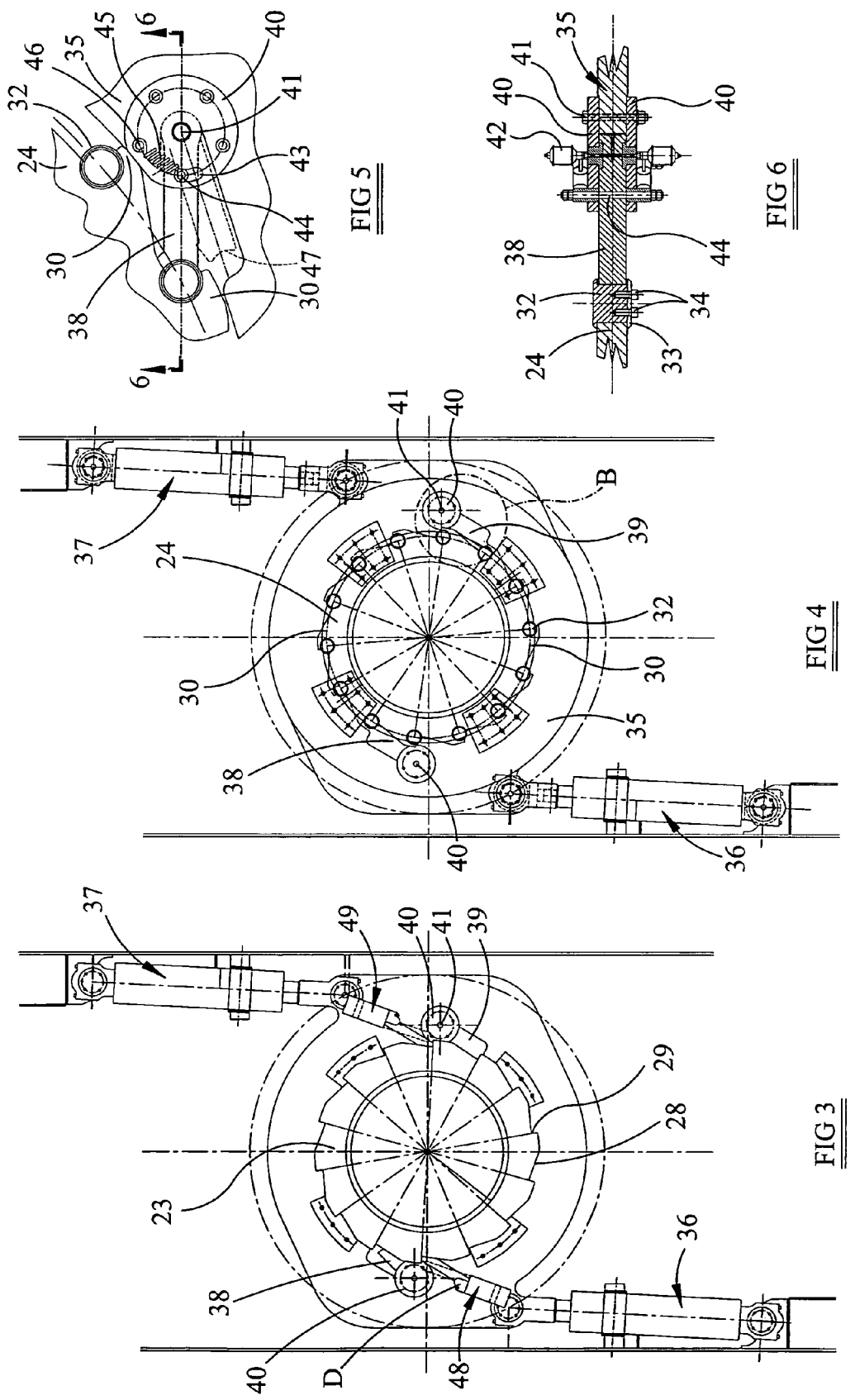

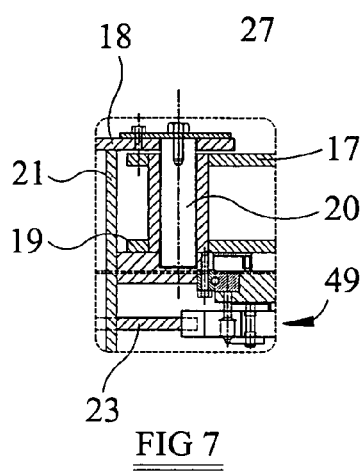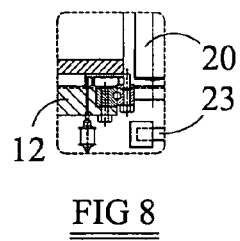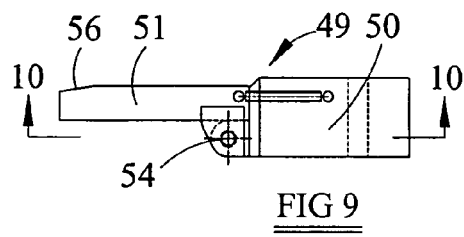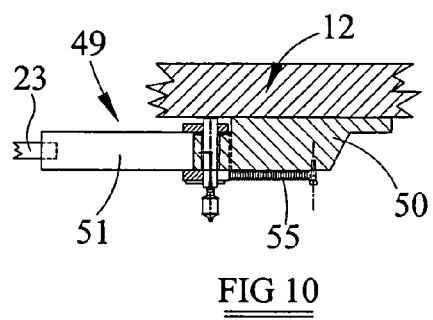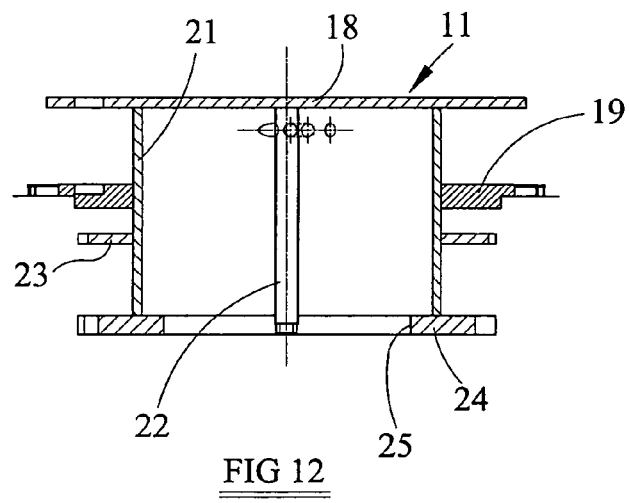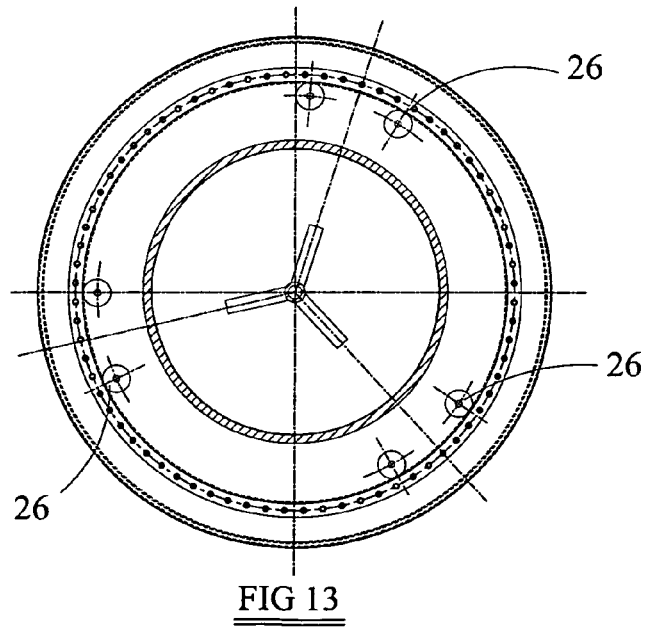

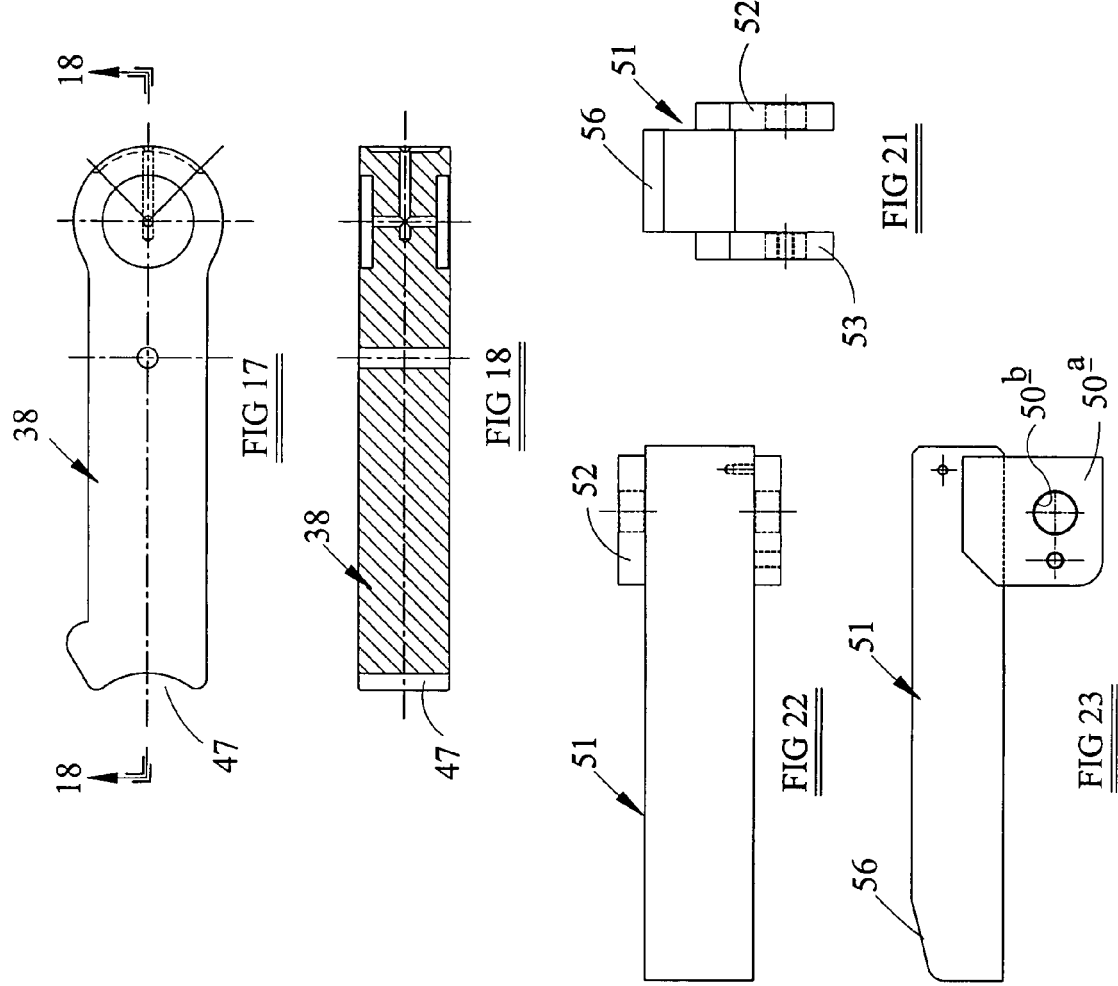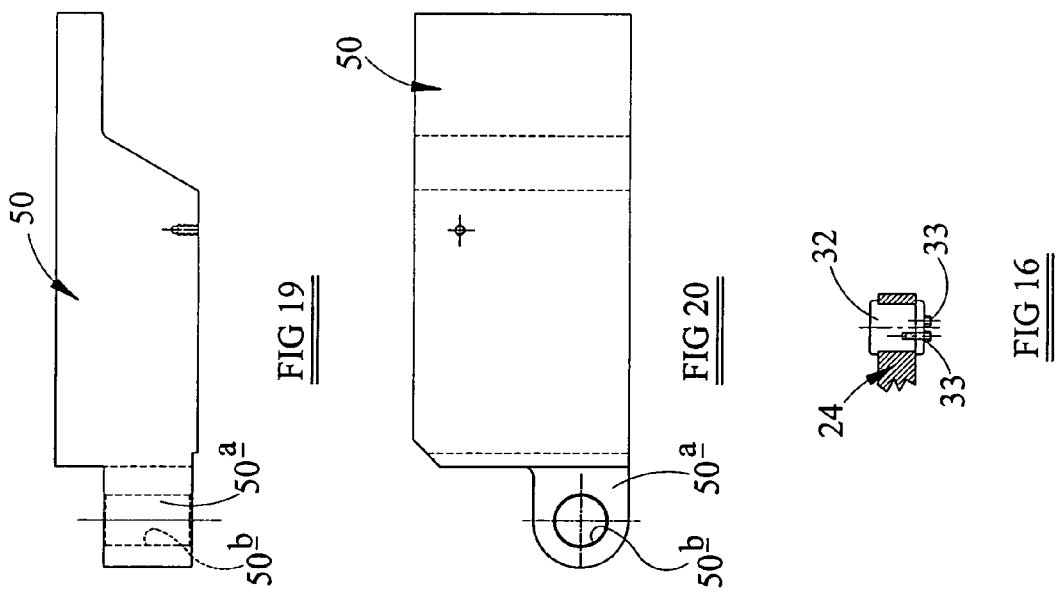

DRIVE ASSEMBLY

BACKGROUND

This invention relates to a drive assembly intended particularly, though not exclusively, for use in the digester disclosed in our British Patent Specification No. 2344584.

SUMMARY OF THE DISCLOSURE

In said Specification it is stated that each of a number of compartments of the digester disposed one above the other has a set of rotatable arms therein mounted on a rotational drive unit.

An object of the invention is to provide a drive unit in a convenient and effective form.

According to the present invention there is provided a drive assembly comprising reciprocating drive means which in one direction of its reciprocating movement from a rest position is in engagement with part of a rotational hub to drive it angularly in one direction to a position where latch means retain the hub against movement in a direction opposite to that in which it is driven, the drive means upon its reciprocating movement in the other direction returning to said rest position, whereupon when its reciprocating cycle repeats, it again drives the previously driven and latched hub angularly in said one direction to a position where it is retained by said latch, so that continuous such reciprocation of the drive means effects rotation of the hub and thus drive thereat, wherein the drive means includes two opposed, parallel drive ram assemblies which extend and retract in unison to effect drive of said hub angularly in said one direction.

Preferably the drive ram assemblies are connected to respective diametrically opposed portions of an outer drive plate. In one embodiment the drive ram assemblies are connected to said portions at the periphery of said outer drive plate. The drive ram assemblies can each be a piston and cylinder arrangement.

More preferably the hub has rotatable therewith an inner drive plate around at least a portion of which is said outer drive plate. The outer drive plate may be an annulus within which is disposed the inner drive plate.

Conveniently the periphery of the inner drive plate is formed with a series of locations for engagement consecutively with said drive means to move the inner drive plate angularly upon each reciprocation of the drive means.

Advantageously each location around the periphery of the inner drive plate is provided with a drive pin, which is preferably replaceable, for example when worn. The drive pin is engaged by a complementarily shaped end of a drive arm of the drive means when the drive means engage the hub to move it angularly.

The drive means can include two drive arms, each pivoted on the outer drive plate and biased to a position to engage one of said drive pins. A free end of each drive arm may be of part cylindrical form matching the part of the drive pin with which it engages. The drive arms may, in one embodiment, be pivoted to the outer drive plates at respective diametrically opposed inner peripheral portions thereof. Each location may provide, in said one or another embodiment, an outer surface over which the drive arm, released from its engagement with a drive pin, rides against its bias, when the outer drive plate is angularly moved by the drive means returning to its rest position.

Desirably the hub has rotatable therewith a ratchet plate, and in one embodiment around the periphery of the ratchet plate is a series of ramps and shoulders engagable by the latch means as the hub is moved angularly by consecutive reciprocations of the drive means.

Preferably the latch means comprises two latches attached to a plate fixed relative to the rotatable hub. In one embodiment, the two latches are respectively attached to said fixed plate at diametrically opposed positions. Each latch may comprise a mounting plate, fixed to said fixed plate, and a latch element pivotally attached to said mounting plate. Each latch element may be biased into engagement with said ratchet plate, an outer free end and engaging one of said shoulders thereof, when the drive means returns to its rest position, to retain the hub against movement in said other direction, and riding over one of said ramps to move to engagement with the next successive shoulder when the hub is angularly driven in said one direction by the drive means.

A plurality of outwardly extending arms may be connected to the hub, so as to move rotationally therewith, in use. At the central rotational axis of the hub there may be provided an air supply tube for passing air, in use, to the arms. Each arm may have at least one air nozzle therein for injecting air, supplied to one end thereof from said air supply tube, out of the arm at a position along its length.

BRIEF DESCRIPTION OF THE DRAWINGS

The invention will now be described, by way of example, with reference to the accompanying drawings, in which:

FIGS. 2 to 4 are views taken on the lines 2-2, 3-3 and 4-4 respectively of FIG. 1, FIG. 5 is a detail of B in FIG. 4, FIG. 6 is a section on line 6-6 of FIG. 5, FIG. 7 is a detail of A in FIG. 1, FIG. 8 is a detail of C in FIG. 1, FIG. 9 is a detail of D in FIG. 3, FIG. 10 is a section of line 10-10 of FIG. 9, FIG. 12 is central section through the hub, FIGS. 13 to 15 are respectively views on the lines 13-13, 14-14 and 15-15 of FIG. 11, FIG. 16 is a section on line 16-16 of FIG. 15, FIG. 17 is a plan view of a drive arm of the drive assembly of FIG. 1, FIG. 18 is a section on the line 18-18 of FIG. 17, FIGS. 19 and 20 are respectively a side view and a top view of a latch mounting plate of the drive assembly, and FIGS. 21 to 23 are respectively an end view, a side view and an underneath view of a latch of the drive assembly.

DETAILED DESCRIPTION OF THE DISCLOSURE

As referred to in the introduction, a drive assembly of the present invention has been particularly designed for use in a waste material digester as disclosed in British Patent Specification No. 2344584. In said digester each of a number of compartments disposed one above the other is provided with a set of rotatable arms mounted on a rotational drive unit. An example of such a rotatable drive unit will hereinafter be described.

Figure 1:
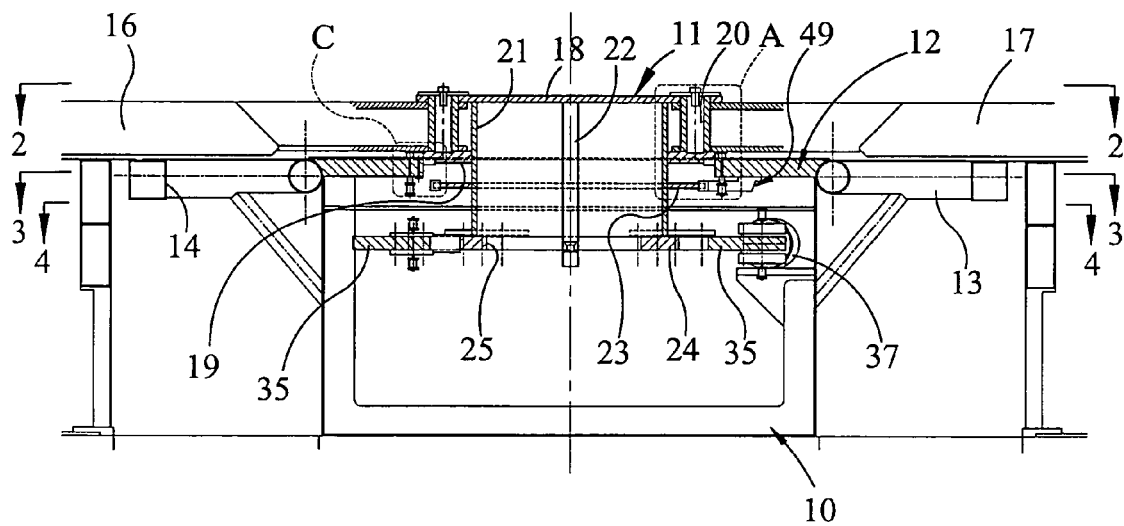
FIG. 1 is a part sectional side view of a drive assembly of the invention.
Figure 2:
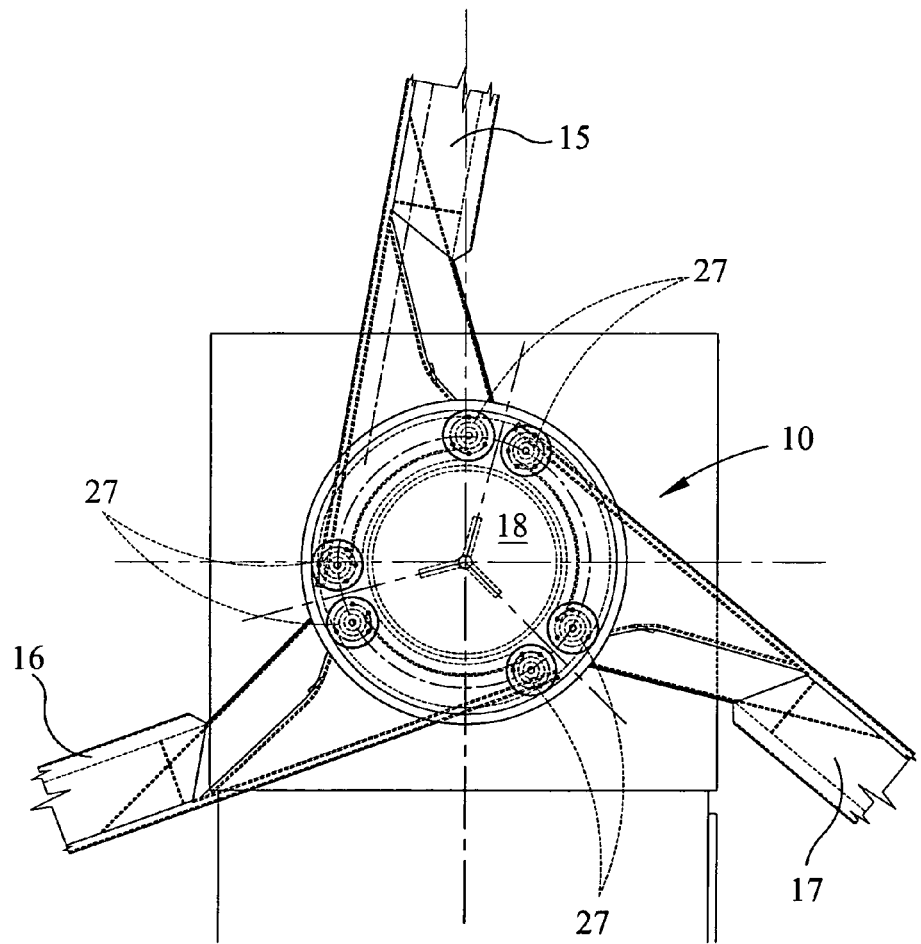
Figure 11:
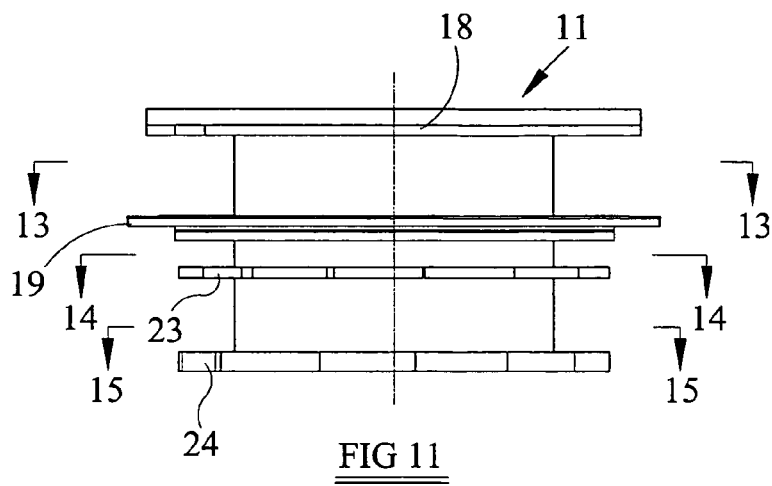
FIG. 11 is a side view of a hub of the drive assembly of FIG. 1.

From FIGS. 1 and 2 there can be seen a floor module centre section 10 of a compartment of the digester and arranged centrally of this is a rotational hub 11, shown alone in FIGS. 11 and 12, of the drive assembly. At the top of the section 10 is fitted a fixed floor module centre section top plate 12 and at respective opposite sides of this are doors 13, 14 to transmit biodegradable material, in use, to the compartment therebelow. It will be seen that the hub 11 has connected to it three equi-angularly spaced arms 15, 16, 17 respectively, and as stated in the above numbered British patent, these rotate in a compartment of the digester when the drive assembly, including the hub 11, rotates, in use, as will be described. It will be seen that each arm is fixed at its inner end between a top plate 18 of the hub 11 and a parallel lower plate 19 thereof by means of a mounting pin 20 shown in detail in FIG. 7.

As can be seen from FIGS. 11 and 12, the hub 11 has a hollow cylindrical body 21 fixed to and extending vertically from the underside of the top plate 18. At the rotational centre of this body 21 is a tube 22 with a universal rotary joint at its lower end. This tube allows air to pass from a series of blower fans through to the arms 15-17, which in turn have air nozzles fitted along the length thereof, thus enabling air to be injected into the waste material to control the temperature of the digester. As stated, a lower plate 19 is below and parallel to the top plate 18, this being welded or otherwise secured in place as shown in FIG. 12 and receiving the lower end of the mounting pin 20 as shown in FIG. 7. The external diameter of this plate 19 is slightly larger than the external diameter of the top plate 18. A short vertical distance below the plate 19 is a ratchet plate 23, which, like the plate 19 is annular, in contrast to the top plate 18 which is wholly circular. This ratchet plate 23 is welded or otherwise fixed to the exterior of the body 21, so as to lie parallel to the top plate 18, its outside diameter being somewhat less than the exterior diameter of the plate 18. Finally at the bottom of the hub 11 there is secured to the lower annular end surface of the body 21, by welding or otherwise, a circular inner drive plate 24 which has an exterior diameter substantially equal to that of the ratchet plate 23, to which it is parallel. The end of the shaft 22 passes through a circular central opening 25 in plate 24, this opening having a diameter only slightly less than the internal diameter of the body 21.

FIG. 13 shows three equi-angularly spaced pairs of arm mounting bores 26 in the plate 19 and FIG. 2 shows respective drive-arm mounting pin retaining plates 27 fitted thereat, these also being shown in FIG. 7.

Figure 14:
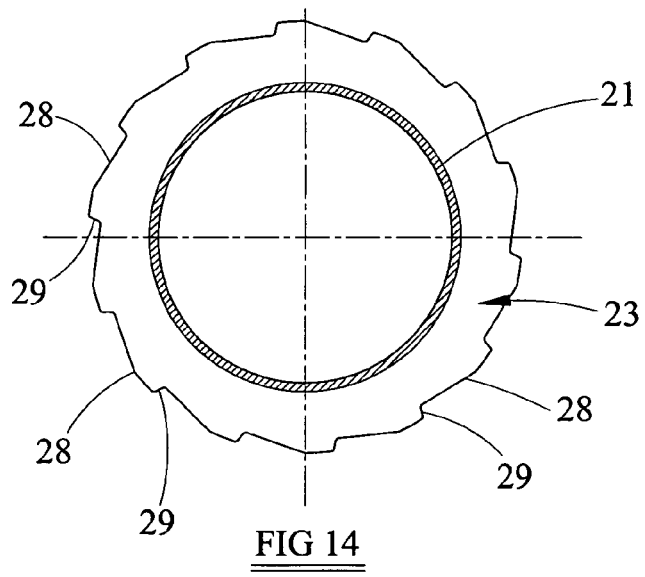

FIG. 14 shows the ratchet plate 23, and from this it can be seen that this annular plate is provided around its periphery with a series of ratchet-like ramp surfaces 28 leading to generally radial shoulders 29 for a purpose to be described hereinafter. The inner drive plate 24 shown in detail in FIG. 15 has around its outer periphery, a series of fingers 30 defining respective locations 31, in each of which is fitted a generally cylindrical drive pin 32, each location being part-cylindrical so that the pin can be received therein, as shown in FIG. 16. Each pin has a circular flanged top which rests on the top of the plate 24 as shown and prevents downward movement of the pin into the location 31. The pin is fixed in position by means of a lower retainer plate 33 of the same form as the flange at the top of the pin, this plate 33 being secured outside of the location to the bottom of the pin by a pair of hexagon socket caphead screws 34 with associated spring washers. Each pin is of a material which although relatively hard, will wear more than the material of the inner drive plate in use, as will be described hereinafter. Accordingly as will be described, instead of replacing the drive plate upon wear in use, it is merely necessary to undo the screws 34, to release the plate 33, whereupon a worn pin 32 can be removed from its location 31 and replaced by a new pin.

Figure 15:
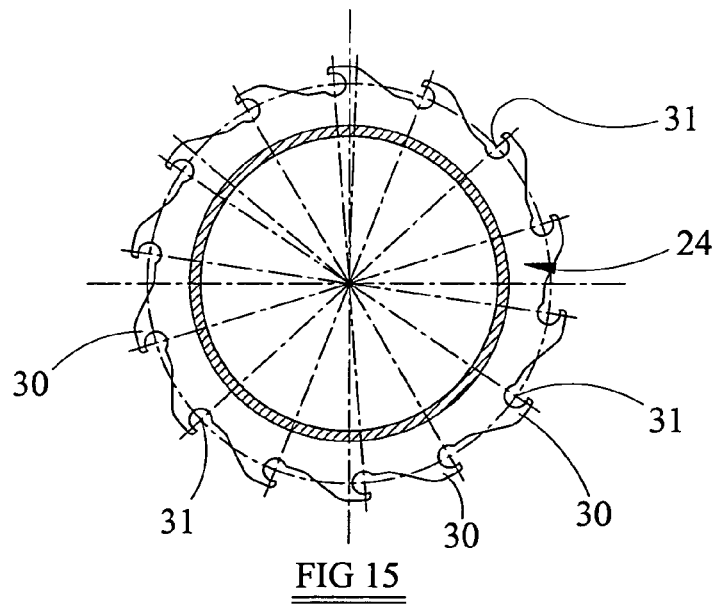

In the embodiment described and illustrated, there are fourteen shoulder surfaces around the periphery of the ratchet plate and similarly there are fourteen locations 31 around the periphery of the inner drive plate. It is important that the annular orientation of the inner drive plate and the ratchet plate respectively is maintained as shown in FIGS. 14 and 15 relative to each other. In other embodiments, it would of course be possible to have a different number of locations and ratchet shoulders, although these would generally always be the same as each other.

As shown in FIG. 1, an outer annular drive plate 35 is around and in juxtaposition with the circular inner drive plate 24, for example as shown in FIG. 5. As shown in FIG. 1, but best in FIGS. 3 and 4, this outer annular drive plate 35 has connected to it, at diametrically opposed peripheral portions thereof respectively, the respective forward ends of piston and cylinder drive ram assemblies 36, 37. In use, extension and retraction of the pistons or rods of these assemblies takes place simultaneously, and the connection of these pistons/rods to the outer drive plate 35 is such that the inward and outward movement together of these pistons/rods of the two drive ram assemblies causes the outer annular drive plate 35 to move reciprocally angularly clockwise (as shown in FIGS. 3 and 4) and then anti-clockwise back to the rest position shown in those Figures. The drive ram assemblies can be powered by any convenient means, such as hydraulics.

It is particularly important with the use of the drive in the digester referred to that there are two, balanced drives, so as to result in pure even torque on the bearing of the digester. This is most satisfactorily achieved by the parallel drives attached at respective diametrically opposed positions on the outer drive plate.

The outer annular drive plate 35 carries, at respective diametrically opposed positions thereon, a pair of drive arms 38, 39, one of which is shown in detail in FIG. 6, this also being shown in FIG. 5, with the drive arm itself being shown in detail in FIGS. 17 and 18.

From these Figures it can be seen that the drive arm is pivotally connected at the centre of a circular pivot plate 40 which is secured to the upper surface of the drive plate 35 as shown best in FIG. 4, there being two such plates at the respective upper and lower surfaces of the drive plate 35 for each drive arm, with a pivot pin 41 extending from the upper pivot plate to the lower one through the drive arm, this pivot pin being at the axial centre of the pivot plate as shown in FIG. 5. As shown in FIG. 6, lubrication means 42 to the arm can also be provided.

As shown in FIG. 5, there is an elongated slot 43 in each pivot plate and a pivot rod 44 through the arm at its upper and lower ends extending through said respective slots. Connected to this pivot rod 44 at least one of the upper and lower sides of the arm is a coiled compression spring 45, the other end of which is connected to a similar pivot rod 46 extending between the upper and lower pivot plates but not passing through the arm. By this means the arm is biased to its FIG. 5 position shown in full lines but is moveable away from that position to its position shown in dashed lines shown in FIG. 5 against the bias of the spring, as will be described. As shown best in FIG. 17, the free end surface of the arm is of part cylindrical form 47 so as closely to engage with the surface of the drive pin 32 in a location 31 which is in the open part of the location so that, as will be described, in use, the end of the arm pushes on to the drive pin so as angularly to move the inner drive plate 24 upon extension of the drive ram assemblies.

To retain the ratchet plate 23, and thus the hub 11, in an angularly moved position as a result of the movement of the inner drive plate 24, briefly described above as a consequence of the extension of the drive ram assemblies, are a pair of anti-runback latches 48, 49 respectively attached at diametrically opposed positions to the underside of the plate 12 and shown best in FIGS. 1, 7, 9 and 10. Each latch is made up of a mounting plate 50 secured to the underside of the plate 12 as shown best in FIG. 10, and a latch element 51 pivotally secured thereto. As shown in FIG. 10, the mounting plate is preferably welded to the underside of the plate 12. The inner free end of the mounting plate defines a pivot mounting block 50a spaced below the level of the underside of the plate 12 and with a circular through bore 50b therein. The latch element 51 has at its one end upper and lower arms 52, 53 respectively which fit over the block 50a to receive a pivot pin 54 to connect the two parts of the latch together. Moreover the two parts carry respective pivot pins which receive the respective ends of a coil compression spring 55 which biases the latch radially inwardly. As can be seen best from FIG. 10, taken in conjunction with FIG. 3, each latch element is biased by the spring 55 so that its outer free end, the side surface of which end is chamfered as at 56, is in engagement with one of the fourteen shoulders 29 adjacent one of the ratchet-like ramp surfaces 28 around the periphery of the ratchet plate 23. In this way the ratchet plate 23 is held against angular movement anti-clockwise as viewed in FIG. 14, so that even with any backlash or back force on the rotating arms in a digested compartment, the hub 11 cannot rotate back (clockwise) as viewed in FIGS. 2 to 4. However the chamfering of the end surface of the latch element means that when the hub 11 rotates clockwise, as described above, the surface rides up over the ramp surfaces 28 against the bias of spring 55 to allow free angular movement of the ratchet plate 23 with the hub 11 and inner drive plate 24. However once the inner drive plate 24 has moved its full extent under the action of the drive arms 38, 39, the latches have then reached the position where they are again biased inwardly to lock against a radial shoulder 29 and thus prevent return angular movement of the ratchet plate 23 and associated hub 11. In FIG. 3, it will be noted that the anti-runback latch assemblies are welded in position as shown using the dimensions as a guide to location with the drive rams fully retracted and the drive hub rotated to provide a gap as indicated in FIG. 4 between the drive arm and the driven pins at the locations 31. Moreover with regard to FIG. 5, it will be noted that this view has been rotated horizontal for clarity and also shows the outer drive plate rotated by 5" clockwise from the position shown in FIG. 4 in order to bring the drive arm into mesh with the driven pin. This corresponds to the drive rams being extended by, for example, approximately 110 mm.

Accordingly in operation, starting with the FIG. 3 position, the respective ends of the two drive arms will either be engagement with respective pins 32 or slightly spaced therefrom. However the ends of the respective latch elements will be in tight engagement with shoulders 29 respectively of the ratchet plate. Therefore anti-clockwise movement of the hub 11 is prevented. Upon simultaneous operation of the drive rams of the assemblies 36, 37 respectively, the outer drive plate 35 will be moved clockwise through a pre-determined angle and this will bring the inwardly biased drive arms 38, 39 into engagement with their associated pins 32, if they are not already in engagement therewith. The extension of the drive rams will thus cause these arms 38, 39 carried on the angularly moving outer drive plate 35 to push on the pins thereby angularly moving, in a clockwise direction, the inner drive plate 24 and thus also the ratchet plate and the remainder of the hub 11. During this movement the latch elements 51 will be riding over the ramp surfaces 28 and are thus out of engagement at the shoulders 29, so that the ratchet plate can move freely upon movement of the inner drive plate 24. When the rams are fully extended, or after they have just started to retract, the latch elements 51 will be biased inwardly so as to engage with respective shoulders 29 thereby locking the ratchet plate against anti-clockwise movement. Moreover as the rams retract and the outer annular drive plate 35 moves angularly in an anti-clockwise direction, the drive arms 38 and 39 move away from the pin 32 and ride along the outer surfaces of the fingers 30, as shown in FIG. 5, to move to the position shown in phantom against the bias of the springs 46. Thus whilst the hub 11, and thus the ratchet plate 23 and the inner drive plate 24 remains stationary, the outer drive plate 35 moves back anti-clockwise through the same amount of angular movement which it previously passed through in a clockwise direction. When the rams are fully retracted, the arms 38, 39 will have cleared the ends of the fingers and will be biased back to the position shown in FIG. 5 in full, or to a position where the end of each arm is slightly spaced from its associated pin.

This procedure is repeated each time the two drive rams are simultaneously extended and retracted, so that the outer drive plate 35 is subjected to a reciprocating annular movement clockwise and anti-clockwise in turn thereby continuously in each clockwise movement angularly moving the inner drive plate 24, and thus the hub 11 in a clockwise direction. Thus the extension of the rams effects rotational drive to the hub 11 and thus to the arms 15, 16 and 17 attached thereto. However it will be appreciated that in other applications the drive to the hub can be used to drive any other component.

What is claimed is:

1. A drive assembly comprising:
reciprocating drive means which in one direction of its reciprocating movement from a rest position is in engagement with part of a rotational hub to drive the hub angularly in one direction to a position where latch means retain the hub against movement in a direction opposite to that in which the hub is driven, the drive means upon its reciprocating movement in the other direction returning to said rest position,
whereupon when its reciprocating cycle repeats, the reciprocating drive means again drives the previously driven and latched hub angularly in said one direction to a position where the hub is retained by said latch, so that continuous such reciprocation of the drive means effects rotation of the hub and thus drive thereat,
wherein the drive means includes two opposed, parallel drive ram assemblies which extend and retract in unison to effect drive of said hub angularly in said one direction and are connected to respective diametrically opposed portions of an outer drive plate,
wherein the hub has rotatable therewith an inner drive plate around at least a portion of which is said outer drive plate,
wherein the periphery of the inner drive plate is formed with a series of locations for engagement consecutively with said drive means to move the inner drive plate angularly upon each reciprocation of the drive means,
wherein each location around the periphery of the inner drive plate is provided with a drive pin, and
wherein each location provides an outer surface over which a drive arm of the drive means, released from its engagement with said drive pin, rides against its bias, when the outer drive plate is angularly moved by the drive means returning to its rest position.

2. A drive assembly comprising:
reciprocating drive means which in one direction of its reciprocating movement from a rest position is in engagement with part of a rotational hub to drive the hub angularly in one direction to a position where latch means retain the hub against movement in a direction opposite to that in which the hub is driven, the drive means upon its reciprocating movement in the other direction returning to said rest position, whereupon when its reciprocating cycle repeats, the reciprocating drive means again drives the previously driven and latched hub angularly in said one direction to a position where the hub is retained by said latch, so that continuous such reciprocation of the drive means effects rotation of the hub and thus drive thereat, wherein the drive means includes two opposed, parallel drive ram assemblies which extend and retract in unison to effect drive of said hub angularly in said one direction and are connected to respective diametrically opposed portions of an outer drive plate, wherein the hub has rotatable therewith an inner drive plate around at least a portion of which is said outer drive plate, wherein the periphery of the inner drive plate is formed with a series of locations for engagement consecutively with said drive means to move the inner drive plate angularly upon each reciprocation of the drive means, and wherein the hub has rotatable therewith a ratchet plate.

3. A drive assembly as claimed in claim 2, wherein around the periphery of the ratchet plate is a series of ramps and shoulders engagable by the latch means as the hub is moved angularly by consecutive reciprocations of the drive means.

4. A drive assembly as claimed in claim 3, wherein the latch means comprises two latches attached to a plate fixed relative to which the rotatable hub is driven.

5. A drive assembly as claimed in claim 4, wherein the two latches are respectively attached to said fixed plate at diametrically opposed positions.

6. A drive assembly as claimed in claim 4, wherein each latch comprises a mounting plate, fixed to said fixed plate, and a latch element pivotally attached to said mounting plate.

7. A drive assembly as claimed in claim 6, wherein each latch element is biased into engagement with said ratchet plate, an outer free end engaging one of said shoulders thereof, when the drive means returns to its rest position, to retain the hub against movement in said other direction, and riding over one of said ramps to move to engagement with the next successive shoulder when the hub is angularly driven in said one direction by the drive means.

* * * * *